(12) United States Patent
Grabowski et al.

(10) Patent No.: US 6,727,670 B1
(45) Date of Patent: Apr. 27, 2004

(54) BATTERY CURRENT LIMITER FOR A HIGH VOLTAGE BATTERY PACK IN A HYBRID ELECTRIC VEHICLE POWERTRAIN

(75) Inventors: John Robert Grabowski, Dearborn, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/248,035

(22) Filed: Dec. 12, 2002

(51) Int. Cl.$^7$ ................................................. H02P 7/00
(52) U.S. Cl. .................... 318/432; 318/139; 701/22; 320/121
(58) Field of Search .............................. 318/432, 139; 701/22; 320/121

(56) References Cited

U.S. PATENT DOCUMENTS

| | | | |
|---|---|---|---|
| 5,569,999 A | * 10/1996 | Boll et al. ................ 320/136 |
| 5,635,805 A | 6/1997 | Ibaraki et al. ............. 318/139 |
| 5,697,466 A | 12/1997 | Moroto et al. ............ 180/65.2 |
| 5,713,814 A | 2/1998 | Hara et al. ................... 477/5 |
| 5,820,172 A | 10/1998 | Brigham et al. ............. 290/40 |
| 5,842,534 A | 12/1998 | Frank ...................... 180/65.2 |
| 5,998,952 A | * 12/1999 | McLaughlin et al. ........ 318/432 |
| 6,026,921 A | 2/2000 | Aoyama et al. ........... 180/65.2 |
| 6,164,400 A | 12/2000 | Jankovic et al. .......... 180/65.2 |
| 6,176,808 B1 | 1/2001 | Brown et al. ................. 477/5 |
| 6,215,198 B1 | 4/2001 | Inada et al. .................. 290/40 |
| 6,223,106 B1 | 4/2001 | Yano et al. .................. 701/22 |
| 6,232,744 B1 | * 5/2001 | Kawai et al. ............... 320/132 |
| 6,232,748 B1 | 5/2001 | Kinoshita .................. 320/132 |
| 6,253,140 B1 | 6/2001 | Jain et al. .................... 701/67 |
| 6,393,350 B1 | * 5/2002 | Light et al. .................. 701/54 |
| 2003/0088343 A1 | * 5/2003 | Ochiai et al. ................ 701/22 |

* cited by examiner

Primary Examiner—Rita Leykin
(74) Attorney, Agent, or Firm—Brooks & Kushman; Carlos Hanze

(57) ABSTRACT

A battery current limiter and current-limiting method for a battery system and an electric motor in a hybrid automotive vehicle powertrain. The battery current limiter monitors measured battery current and torque commands. A modified current is developed to take a predetermined current margin into account. The modified current reduces battery current in a closed loop fashion simultaneously with a reduction in commanded torque by a feed-forward torque value.

6 Claims, 3 Drawing Sheets

BATTERY CURRENT LIMITER FOR A HIGH VOLTAGE BATTERY PACK IN A HYBRID ELECTRIC VEHICLE POWERTRAIN

BACKGROUND OF THE INVENTION

1. Field of the Invention

The invention relates to an electric motor power source for an electric traction drive including a current limiter.

2. Background Art

There is a variety of vehicle powertrains that employ a high voltage battery and an electric driving motor as a primary source of power. If an internal combustion engine is included in the powertrain in combination with the electric driving motor, the powertrain usually is referred to as a hybrid powertrain. An example of a hybrid vehicle powertrain is disclosed in U.S. Pat. No. 6,176,808, which is assigned to the assignee of the present invention. The powertrain of the '808 patent includes an induction motor that complements engine torque to provide improved launch performance. The engine may be deactivated when the vehicle is at rest.

A hybrid powertrain can be characterized as a series hybrid powertrain or a parallel hybrid powertrain or a combination of both. In a series hybrid powertrain, a generator is driven by an engine, and the generator, together with a battery, power a vehicle driving motor. The battery is charged by the generator. The engine can be mechanically coupled to the driving wheels during an engine driving mode. In a parallel hybrid powertrain, the engine is coupled to the output shaft of an electric motor. The output torque of the engine and the output torque of the motor are then supplied along parallel torque flow paths to the driving wheels. An example of a hybrid vehicle powertrain of this kind is disclosed in U.S. Pat. No. 5,635,805.

A parallel hybrid electric vehicle powertrain has a split power flow path. The motor torque and the engine torque are combined using a geared transmission system, the battery system providing energy storage for the generator and motor.

In hybrid electric vehicle powertrains, as well as in pure electric vehicle powertrains, the power source requires a high voltage battery, which is a major cost component for the powertrain. Because of the cost, the overall life expectancy and durability of the battery present a major issue in any evaluation of the feasibility of these kinds of vehicles. The battery, furthermore, requires periodic recharging. One of the limitations of the battery charging procedure is the possibility of developing excessive temperatures. Excessive temperatures may result also if the battery is discharged at an excessive rate.

All of the operating conditions for the battery are continuously monitored in a typical hybrid electric vehicle powertrain. These conditions are distributed to a vehicle control system, which must be calibrated to protect the battery from developing excessive temperatures due to overcharging or discharging, thereby preserving battery life.

SUMMARY OF INVENTION

The invention provides precise control of the electric motor torque demand on the battery's subsystem. The greatest power demand typically is the electric traction drive. The invention provides improvement in the life and durability of the battery by precisely controlling the demands on the battery subsystem. A battery current limiter is included in the control system of the invention for continuously monitoring the battery conditions. That monitored information is used to reduce the torque produced by the electric drive. This, in turn, limits the battery current, thereby ensuring increased battery life.

The method and current limiter of the invention monitors battery system conditions, which are delivered to a vehicle controller. A torque command is developed by the vehicle controller and delivered to an electric drive motor system, which includes a power converter and the electric motor, whereby electric driving power is developed. A feed-forward torque signal, which is a function of commanded torque, maximum current limit and a calibrated margin current, is delivered in a feed-forward fashion to the vehicle controller whereby a modified torque signal is developed. This torque signal is an estimate of the amount of torque reduction needed to prevent the commanded torque from exceeding a commanded torque corresponding to a maximum current limit.

DETAILED DESCRIPTION

Figure 1:
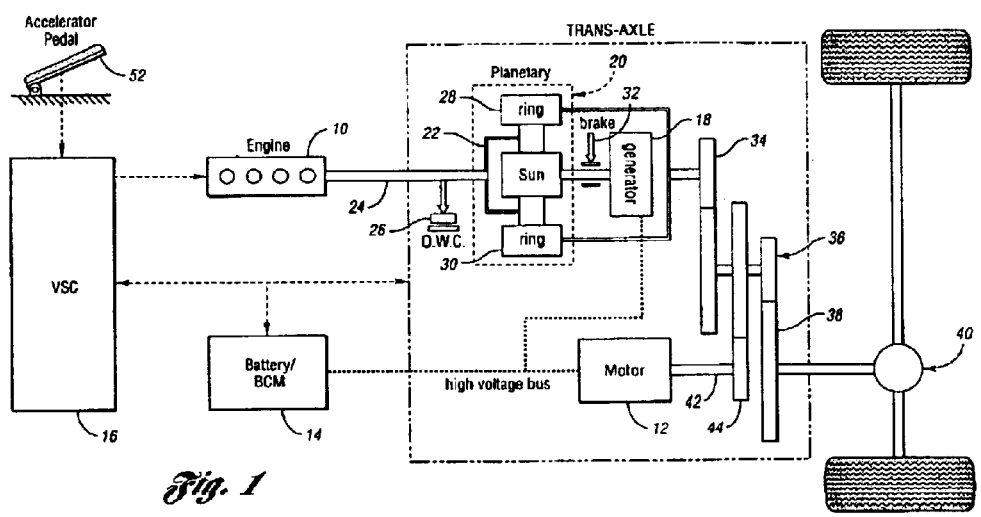
FIG. 1 is a schematic representation of a parallel hybrid electric vehicle powertrain, which includes an engine, a motor, a generator, and a planetary gear system in a powertrain torque flow path.

For the purpose of describing an operating environment for the battery current limiter of the invention, reference first will be made to FIG. 1, which discloses a power split hybrid electric vehicle powertrain. The powertrain includes an internal combustion engine 10 and an electric motor 12, which may be an induction motor. A battery and battery control module 14 communicates with a vehicle system control module 16. It communicates also with motor 12 and with generator 18.

A planetary gear unit 20 includes a planetary carrier 22, which is connected to the crankshaft of the engine 10, as shown at 24. An overrunning brake 26 provides a torque reaction to the powertrain stationary housing if there is a torque reversal in the powertrain, whereby the carrier 22 would act as a reaction element. Ring gear 28 engages pinions carried by the carrier 22. Sun gear 30, which engages the pinions, is connected mechanically to the generator 18. A sun gear brake 32 is adapted to selectively anchor the sun gear.

Ring gear 18 is directly connected to a torque input gear 34 for a speed reduction gear assembly 36. The torque output element of the gear assembly 36 is gear 38, connected to a differential and axle assembly schematically shown at 40.

The motor armature is connected, as shown at 42, to motor torque input gear 44, which supplies torque through the gear system 36 in parallel relationship with respect to engine torque delivered through planetary gear unit 20.

Figure 2:
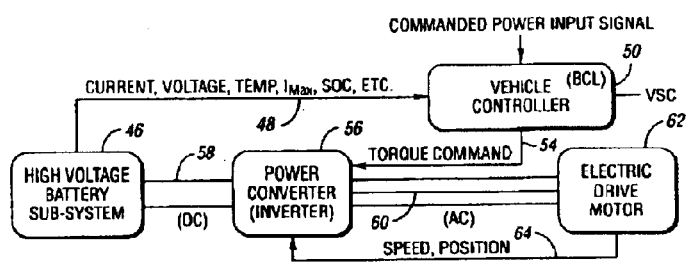
FIG. 2 is a diagram of the overall system configuration.

FIG. 2 shows a diagram of the overall system. The system includes a high voltage battery subsystem 46, which would include the battery 14 of FIG. 1. The high voltage battery subsystem effects a continuous monitoring of the battery conditions; that is, it continuously monitors current, voltage, temperature, maximum current, state of charge, etc. That monitored data is distributed through signal flow path 48 to the vehicle system controller 50, which corresponds to the vehicle system controller 16 of FIG. 1.

The previously mentioned battery current limiter is part of the controller 50. A commanded power input signal, such as an accelerator pedal position signal, is shown at 52 in FIG. 1. Controller 50 responds to pedal position and issues a torque command signal, as shown at 54, to a power converter 56. The converter 56 receives direct current voltage along power distribution path 58 and converts it to an alternating current voltage, which is distributed along alternating current flow path 60 to an electric drive motor system 62. For purposes of this description, the electric drive motor and the power converter may be referred to as an electric drive motor system, which includes converter 56 and motor 12.

The electric drive motor speed and the rotor position relative to the stator of the electric drive motor are monitored to develop signals that are distributed along signal flow path 64 to the converter 56 in a closed-loop signal feedback path.

The battery current limiter of FIG. 2 prevents excessive battery current spikes, as will be explained subsequently. It also smoothly limits high transient battery currents and provides a low state-of-charge torque demand margin adjustment. These features improve the durability of the battery and increase battery life expectancy.

The high voltage battery subsystem is subject to conditions that affect the maximum instantaneous current that can be drawn from or delivered into the battery. The battery subsystem provides a method for indicating the maximum safe current available for the battery's present conditions; that is, for the present battery temperature, state-of-charge and voltage. In this regard, the battery subsystem includes a battery control module (BCM), which generates a signal that represents the maximum current ($I_{max}$) that can safely be drawn from or delivered into the battery.

The high voltage battery system may provide two separate signals for a recommended battery current limit, one signal being active while charging and the other being active while discharging. Since the battery control module cannot control its own current, these limits, which are observed by the vehicle controller 50, prevent the battery from delivering current in excess of the limits, thereby ensuring maximum battery life. The present invention achieves this limiting function by reducing the system electric current drive torque command, which is the largest load for the battery, to levels that will prevent the battery current from exceeding undesirable levels.

Figure 3:
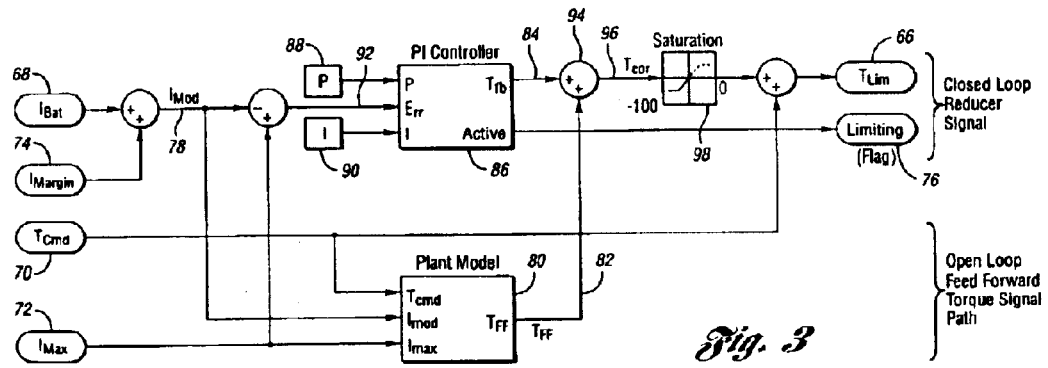
FIG. 3 is a schematic representation of a battery current limiter used in the powertrain of the invention.

In FIG. 3, the torque command that is sent to the electric drive is shown at 66. This value is represented by the symbol $T_{lim}$. The battery current limiter (BCL) of the invention reduces the torque command to regulate the battery current level to a value less than that instructed by the battery control module (BCM). In the diagram of FIG. 3, the battery current shown at 68 is controlled by limiting the torque command to the electric drive motor system. The load on the battery thus is reduced and, consequently, the battery current $I_{bat}$ at 68 is lowered. The battery current limiter of FIG. 3 will work for both positive and negative torque commands (i.e., charging and discharging modes).

Under normal conditions, the vehicle system control module 50 will generate a torque command ($T_{cmd}$) as shown at 70; and the electric drive will attempt to produce the requested torque. If at any time the battery current at 68 approaches the battery current limit $I_{max}$, as shown at 72, the battery current limiter will begin operating to reduce the torque command to the electric drive torque $T_{lim}$. This will reduce the battery current below the current limit. As the torque requested from the electric drive is reduced, so is the current demand on the battery.

The battery control module will sense any change in battery condition and correspondingly adjust the current limit signal $I_{max}$. The battery current limiter will track any change in the value of the $I_{max}$ signal and limit the battery current accordingly.

Figure 4:
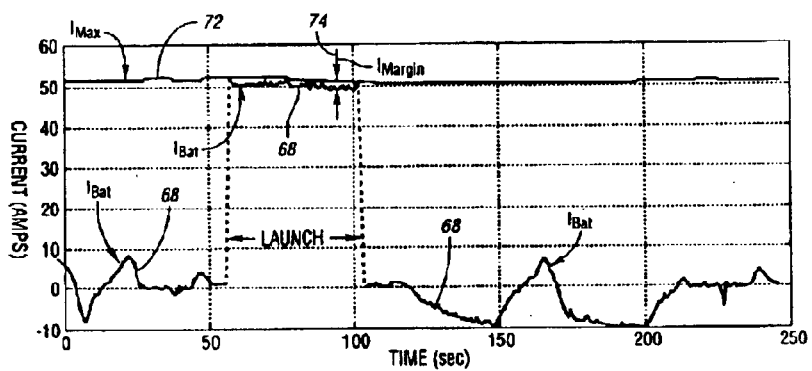
FIG. 4 is a plot showing the battery current over an operating interval, which would include a vehicle launch event.

In the diagram of FIG. 3, the battery current limit ($I_{max}$) from the battery current limiter is identified at 72. The current margin setting ($I_{margin}$) is a margin value that prevents the current from reaching the value of $I_{max}$. This is a safety precaution. In the diagram of FIG. 4, the value for $I_{margin}$, shown at 74 in FIG. 3, is the difference between the value for $I_{max}$, as shown at 72 in FIG. 3, and the measured battery current ($I_{bat}$) shown at 68 in FIG. 3.

The system output signals in FIG. 3 are a value of $T_{lim}$ at 66, and a flag 76 that indicates when the battery current limiter is active.

Operation of the battery current limiter of FIG. 3 is based on a feed-forward and feedback control system. The battery current at 68 is measured and then is added to the current margin signal at 74 to generate a modified battery current signal ($I_{mod}$) at 78. The $I_{margin}$ signal at 74 is pre-calibrated to provide a safety margin for the regulation of battery current.

The diagram of FIG. 3 includes a so-called plant model block 80, which receives signals indicating the torque command at 70, the maximum current at 72 and the modified current at 78. Block 80 generates a feed-forward signal $T_{ff}$ at 82. This is an attempt to estimate in a feed-forward manner the torque reduction to prevent the value for $I_{mod}$ from exceeding $I_{max}$. The feed-forward signal is immediately added to the feedback torque $T_{fb}$ at 84, as shown at 96, which quickly reduces the value of the limited torque $T_{lim}$ at 66. The algorithm used to estimate the $T_{ff}$ signal is the following:

$$T_{ff} = T_{cmd} \cdot \left[ \frac{I_{max}}{I_{mod}} - 1 \right],$$

As indicated above, this value for $T_{ff}$ is an estimate of how much the torque must be reduced to prevent $I_{mod}$ from exceeding $I_{max}$.

The modified battery current $I_{mod}$ is also fed into the proportional-integral (PI) controller block 86, which develops the previously mentioned torque signal $T_{fb}$. The PI controller block produces an output that is a function of difference between the $I_{mod}$ signal and the $I_{max}$ signal. It is used to complete the process of regulating battery current in a closed-loop manner.

The controller 86 has a proportional gain, as shown at 88. That gain may be, for example, 10 NM per amp. Likewise, the block 86 includes an integral gain 90.

The differences between the value of $I_{mod}$ at 78 and the value of $I_{max}$ at 72 is received by the PI controller, as shown at 92. The output at 84 for the controller 86 is a function of the difference between $I_{mod}$ and $I_{max}$. This value is used to complete the process of regulating the battery current in a closed-loop manner. It performs its function by generating two torque signals, one from the proportional error and the other from the integral of the error. Each term has an independent gain setting, as shown at 88 and 90. The two signals then are summed. The output of the PI controller block and the output of the plant model block 80 are added at 94 to form the torque correction signal $T_{cor}$ at 96. The $T_{cor}$ signal is added to the input torque signal $T_{cmd}$, thus proportionately reducing the torque to the electric drive when the modified battery current $I_{mod}$ exceeds a current limit setting $I_{max}$.

Since the $T_{cor}$ signal is passed through a negative-only limiting block, as shown at 98, only negative torque errors are considered when the requested torque is too high. Thus, the output torque demand may only be decreased. It can never be increased. As the torque applied to the electric drive motor is reduced, the load on the battery also is reduced and the battery current is limited. When the transient demand has passed, the torque correction will go to zero, and the output torque $T_{lim}$ will again equal the desired input commanded torque $T_{cmd}$.

FIG. 4 is a plot showing the behavior of the battery current $I_{bat}$ during a typical driving mode, which includes a vehicle launch period. The vehicle launch period in the example indicated in FIG. 4 may occur approximately 55 seconds from the start of the vehicle operating event to a time of about 105 seconds. During that launch period, the value for $I_{bat}$ increases to a very high level, which approaches the value of $I_{max}$. The measured battery current is separated from the value of $I_{max}$, however, by the value $I_{margin}$. FIG. 4 demonstrates that the output torque is allowed to reach its maximum value while the battery current is prevented from exceeding the current limit.

Figure 5:
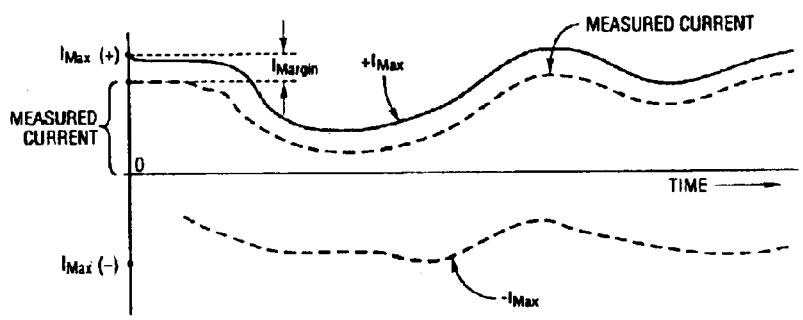
FIG. 5 is a plot of measured battery current for a high voltage battery subsystem during a given operating period.

FIG. 5 is a typical plot of measured current for high voltage battery sub-system 46. The value for $I_{max}$ can vary depending upon the battery conditions. The measured current, however, always will be separated from the variable value for $I_{max}$ by a margin value of at least $I_{margin}$ when the battery current limiter is functioning, as shown by the flag at 76 in FIG. 3.

An embodiment of the invention has been described in this specification, but it will be apparent to persons skilled in the art that modifications may be made by persons skilled in the art without departing from the scope of the invention. All such modifications and equivalents thereof are included within the scope of the following claims.

What is claimed is:

1. A control method for limiting battery current in an electromotive powertrain for a vehicle, the powertrain including a high voltage battery system in an electric power circuit for an electric drive motor system and a vehicle controller that is responsive to a commanded power input signal, the method comprising the steps of:

monitoring battery system conditions including battery current, voltage, temperature, maximum current limit and state of charge;

delivering to the vehicle controller the monitored conditions;

developing a torque command and delivering it to the electric drive motor system whereby electric driving power for the vehicle is developed;

developing a feed-forward torque signal that is a function of commanded torque, maximum current limit and a current marginal value equal to a calibrated difference between maximum current and measured current, and delivering the feed-forward torque signal to the vehicle controller whereby a modified torque signal is delivered to the electric drive motor system, the modified torque signal being an estimate of the amount of torque reduction needed to prevent the commanded torque from exceeding a torque corresponding to the maximum current limit.

2. A control method for limiting battery current in an electromotive powertrain for a vehicle, the powertrain including a high voltage battery system in an electric power circuit for an electric drive, and a vehicle controller that is responsive to a commanded power input signal, the method comprising the steps of:

monitoring battery system conditions including battery current, voltage, temperature, maximum current limit and state of charge;

developing a torque commanded and delivering it to the electric drive motor system whereby electric driving power for the vehicle is developed;

developing a summation of a measured battery current and a calibrated marginal current to obtain a modified battery current;

developing a feed-forward torque signal that is a function of commanded torque, maximum current limit and modified battery current, and delivering the feed-forward torque signal to the vehicle controller whereby a modified limited torque signal is delivered to the electric drive motor, the modified torque signal being an estimate of the reduction in torque that is needed to prevent the modified battery current from exceeding the maximum current limit.

3. A battery current limiter for an electromotive powertrain for a vehicle, the powertrain having an electric drive, a vehicle powertrain controller with a commanded torque input, a high voltage battery system, the current limiter comprising:

a battery current sensor;

a maximum current sensor;

a sensor for determining a current marginal value for a given sensed maximum current;

a first comparator for developing a modified current value that is equal to measured battery current increased by the current marginal value;

a second comparator for developing a comparator signal equal to the difference between a maximum current and the modified current;

a proportional integral controller having a comparator signal input for developing a limited torque signal; and a power plant control for developing a feed-forward torque signal which is added to the output of the proportional integral controller whereby the modified current value is prevented in a closed-loop fashion from exceeding the maximum current.

4. The method set forth in claim 1 wherein the step of developing a feed-forward torque signal includes calculating the feed-forward torque signal in accordance with the algorithm:

$$T_{ff} = T_{cmd} \cdot \left[\frac{I_{max}}{I_{mod}} - 1\right],$$

where $T_{ff}$=torque feed-forward;

$T_{cmd}$=commanded torque;

$I_{max}$=maximum current;

$I_{mod}$=modified current.

5. The method set forth in claim 2 wherein the step of developing a feed-forward torque signal includes calculating the feed-forward torque signal in accordance with the algorithm:

$$T_{ff} = T_{cmd} \cdot \left[ \frac{I_{\max}}{I_{mod}} - 1 \right],$$

where
- $T_{ff}$=torque feed-forward;
- $T_{cmd}$=commanded torque;
- $I_{max}$=maximum current;
- $I_{mod}$=modified current.

6. The battery current limiter set forth in claim 3 wherein the power plant control includes a means for developing a feed-forward torque signal which is added to the output of the proportional integral controller in accordance with the algorithm:

$$T_{ff} = T_{cmd} \cdot \left[ \frac{I_{\max}}{I_{mod}} - 1 \right],$$

where
- $T_{ff}$=torque feed-forward;
- $T_{cmd}$=commanded torque;
- $I_{max}$=maximum current;
- $I_{mod}$=modified current.

* * * * *